(12) United States Patent
Ose et al.

(10) Patent No.: US 10,355,267 B2
(45) Date of Patent: Jul. 16, 2019

(54) CATHODE MIXTURE, CATHODE, AND ALL-SOLID-STATE LITHIUM ION SECONDARY BATTERY, AND METHOD FOR MANUFACTURING THE SAME

(71) Applicant: TOYOTA JIDOSHA KABUSHIKI KAISHA, Toyota-shi, Aichi-ken (JP)

(72) Inventors: Norihiro Ose, Shizuoka-ken (JP); Hikaru Aso, Susono (JP); Keisuke Omori, Kariya (JP); Hajime Hasegawa, Susono (JP); Mitsutoshi Otaki, Susono (JP); Hideyuki Koga, Numazu (JP)

(73) Assignee: Toyota Jidosha Kabuhiki Kaisha, Toyota-shi, Aichi-ken (JP)

( * ) Notice: Subject to any disclaimer, the term of this patent is extended or adjusted under 35 U.S.C. 154(b) by 279 days.

(21) Appl. No.: 15/424,459

(22) Filed: Feb. 3, 2017

(65) Prior Publication Data
US 2017/0244097 A1    Aug. 24, 2017

(30) Foreign Application Priority Data
Feb. 18, 2016    (JP) .................................. 2016-029212

(51) Int. Cl.
*H01M 4/36*    (2006.01)
*H01M 4/136*    (2010.01)
(Continued)

(52) U.S. Cl.
CPC .......... *H01M 4/364* (2013.01); *H01M 4/0404* (2013.01); *H01M 4/13* (2013.01);
(Continued)

(58) Field of Classification Search
CPC ........ H01M 4/136; H01M 4/13; H01M 4/139; H01M 4/0404; H01M 4/364;
(Continued)

(56) References Cited

U.S. PATENT DOCUMENTS

2010/0112456 A1   5/2010  Kimura et al.
2017/0077548 A1   3/2017  Omori et al.

FOREIGN PATENT DOCUMENTS

JP    2011-187253 A     9/2011
JP    2015008073 A      1/2015
WO    2008/123394 A1   10/2008

*Primary Examiner* — Brittany L Raymond
(74) *Attorney, Agent, or Firm* — Dickinson Wright, PLLC

(57) ABSTRACT

A method is provided where an anode of an all-solid-state lithium ion secondary battery is easily doped with lithium and to provide a small resistance at a low battery capacity. The method includes a manufacturing method of a cathode including mixing at least a conductive assistant (C1) and a sulfide solid electrolyte (E1) to obtain a mixture; and mixing at least one cathode active material, a solid electrolyte (E2) and the mixture obtained from the first step to obtain a cathode mixture, wherein an amount of energy added to the sulfide solid electrolyte (E1) is larger than an amount of energy added to the solid electrolyte (E2), and the mixture is a material that releases lithium ions at a potential lower than a potential at which the cathode active material releases and occludes lithium ions. Manufacturing methods for a cathode and an all-solid-state lithium ion secondary battery including the cathode mixture are also disclosed.

15 Claims, 5 Drawing Sheets

(51) Int. Cl.
*H01M 4/58* (2010.01)
*H01M 10/0525* (2010.01)
*H01M 10/0585* (2010.01)
*H01M 10/0562* (2010.01)
*H01M 4/04* (2006.01)
*H01M 4/13* (2010.01)
*H01M 4/139* (2010.01)
*H01M 4/62* (2006.01)
*H01M 4/02* (2006.01)

(52) U.S. Cl.
CPC ........... *H01M 4/136* (2013.01); *H01M 4/139* (2013.01); *H01M 4/5815* (2013.01); *H01M 4/621* (2013.01); *H01M 4/624* (2013.01); *H01M 10/0525* (2013.01); *H01M 10/0562* (2013.01); *H01M 10/0585* (2013.01); *H01M 2004/027* (2013.01); *H01M 2004/028* (2013.01); *H01M 2300/0068* (2013.01)

(58) Field of Classification Search
CPC .... H01M 4/5815; H01M 4/621; H01M 4/624; H01M 2004/027; H01M 2004/028; H01M 10/0525; H01M 10/0585; H01M 10/0562; H01M 2300/0068
See application file for complete search history.

UNCHARGED

FIRST CHARGE
(LESS THAN LOWER-
LIMIT VOLTAGE)

FIRST CHARGE
(NO LESS THAN LOWER-
LIMIT VOLTAGE)

FIRST DISCHARGE
(NO LESS THAN LOWER-
LIMIT VOLTAGE)

SECOND CHARGE AND AFTER
(NO LESS THAN LOWER-LIMIT
VOLTAGE)

SECOND DISCHARGE AND AFTER
(NO LESS THAN LOWER-LIMIT
VOLTAGE)

CATHODE MIXTURE, CATHODE, AND ALL-SOLID-STATE LITHIUM ION SECONDARY BATTERY, AND METHOD FOR MANUFACTURING THE SAME

TECHNICAL FIELD

The present application discloses a method for manufacturing a cathode mixture, a method for manufacturing a cathode, a method for manufacturing an all-solid-state lithium ion secondary battery, a cathode mixture, a cathode, and an all-solid-state lithium ion secondary battery.

BACKGROUND

Patent Literature 1 discloses a method for manufacturing an all-solid-state lithium ion secondary battery, including stacking a cathode electrode body that includes a cathode active material layer and a solid electrolyte layer formed on the cathode active material layer, and an anode electrode body that includes an anode active material layer and a solid electrolyte layer formed on the anode active material layer, in a manner that the solid electrolyte layers are overlapped each other, and carrying out a heat press. Like this, all-solid-state lithium ion secondary batteries have a structure where a cathode, a solid electrolyte layer and an anode are stacked together.

CITATION LIST

Patent Literature

Patent Literature 1: JP 2015-008073 A

SUMMARY

Technical Problem

According to the findings of the inventors of the present disclosure, a conventional all-solid-state lithium ion secondary battery like the above has a drawback that it has a large resistance at a low battery capacity (low SOC). Therefore, the inventors of the present disclosure carried out intensive research, and found that it is possible to lower the resistance at a low SOC, by doping in advance the anode of an all-solid-state lithium ion secondary battery with lithium, whereby various effects, such as improvements in the initial discharge capacity, initial output and durability, are obtained.

Based on this finding, the present application discloses a method for manufacturing a cathode mixture, a method for manufacturing a cathode, a method for manufacturing an all-solid-state lithium ion secondary battery, a cathode mixture, a cathode and an all-solid-state lithium ion secondary battery, where an anode of an all-solid-state lithium ion secondary battery can be doped with lithium, whereby it is possible to lower the battery resistance at a low battery capacity.

Solution to Problem

As a result of intensive research, the inventors of the present disclosure found the following:
(1) In obtaining a mixture of a sulfide solid electrolyte and a conductive assistant, by adding a larger amount of energy than before to the sulfide solid electrolyte in the mixing (adding an energy larger than the energy added in manufacturing a cathode mixture in a conventional method), the mixture can release lithium ions at a potential lower than the potential at which the cathode active material releases and occludes lithium ions.
(2) When a cathode is obtained with the cathode mixture that includes the above mixture, and an all-solid-state lithium ion secondary battery is formed including the cathode, the mixture in the cathode releases lithium ions at a low voltage at a first charge. The lithium ions reach the anode, and as a result, it is possible to dope the anode with lithium at a low voltage. That is, it is possible to dope the anode with lithium when the battery is in a state ranging between that of an uncharged state and that of when the battery has a lower-limit voltage. This makes it possible to make the battery voltage small at a low battery capacity when the battery is charged and discharged afterward.
(3) In other words, at the first charge, in the all-solid-state lithium ion secondary battery that can make an electrochemical reaction of battery (release of lithium ions from the cathode) at a voltage less than the lower-limit voltage of the battery, the anode can be doped with lithium before the battery reaches the lower-limit voltage. Such a battery can be clearly specified by the ratio of a and b (a/b) defined as follows:
a: maximum value of dQ/dV of the battery at the first charge when it is between that of an uncharged state and that of when the battery has a voltage less than the lower-limit voltage
b: maximum value of dQ/dV of the battery at the first charge when it is between that of when the battery has the lower-limit voltage and that of when the battery has the upper-limit voltage.

In order to solve the above problem with consideration of the above findings, the present disclosure is directed to the following embodiments. That is, an embodiment of the present disclosure is a method for manufacturing a cathode mixture including: a first step of mixing at least a conductive assistant (C1) and a sulfide solid electrolyte (E1) to obtain a mixture; and a second step of mixing at least a cathode active material, a solid electrolyte (E2) and the mixture from the first step to obtain a cathode mixture, wherein an energy added to the sulfide solid electrolyte (E1) in the first step is larger than an energy added to the solid electrolyte (E2) in the second step, and the mixture obtained in the first step is a material that releases lithium ions at a potential lower than a potential at which the cathode active material releases and occludes lithium ions.

"Conductive assistant" means a material that improves the conductivity of the cathode mixture. For the conductive assistant, any conductive assistant used in lithium ion secondary batteries may be applied. "Sulfide solid electrolyte" means a solid electrolyte that includes a sulfide. For the sulfide solid electrolyte, any sulfide solid electrolyte used in lithium ion secondary batteries may be applied. That is, any solid electrolyte that includes lithium (Li) and sulfur (S) as its constituent elements may be applied. For "solid electrolyte", any solid electrolyte used for lithium ion secondary batteries may be applied. That is, any solid electrolyte that includes lithium (Li) as its constituent element may be applied. "Energy" means an energy generated by the mixing operation of the sulfide solid electrolyte and the solid electrolyte, which is added to the sulfide solid electrolyte and the solid electrolyte. For example, "mechanical energy" added to the sulfide solid electrolyte and the solid electrolyte by collision, mixing and the like. may be provided. The larger the energy added to the sulfide solid electrolyte and the solid electrolyte is, the larger the degree of fracture and transformation of the sulfide solid electrolyte and the solid electrolyte become.

In the method for manufacturing a cathode mixture of the present disclosure, in the first step, the conductive assistant (C1) and the sulfide solid electrolyte (E1) may be mixed by a ball mill. In one embodiment the energy added to the sulfide solid electrolyte (E1) can be by mechanical mixing.

In the method for manufacturing a cathode mixture of the present disclosure, in the second step, the cathode mixture may include the mixture in an amount of from 1.7 mass % to 9.2 mass % based on the entirety of the cathode mixture as 100%. "In terms of solid content" means that liquid such as solvent is not converted when the mass ratio of the mixture in the entirety of the cathode mixture is specified. In one embodiment the energy added to the solid electrolyte (E2) in the second step can be by mechanical mixing.

In the method for manufacturing a cathode mixture in the present disclosure, in the first step, the sulfide solid electrolyte (E1) in an amount of from 200 pts. by mass to 1600 pts. by mass may be mixed per 100 pts. by mass of the conductive assistant (C1).

In the method for manufacturing a cathode mixture of the present disclosure, in the second step, a sulfide solid electrolyte (E3) may be used as the solid electrolyte (E2).

In the method for manufacturing a cathode mixture of the present disclosure, in the second step, a conductive assistant (C2) and a binder may be further mixed, in addition to the cathode active material, the solid electrolyte (E2) and the mixture.

An embodiment of the present disclosure is a method for manufacturing a cathode including arranging the cathode mixture manufactured by the above-described method, onto a surface of a cathode current collector.

The method for manufacturing a cathode of the present disclosure may include obtaining a cathode mixture paste that includes the cathode mixture and a solvent; and applying the cathode mixture paste on the surface of the cathode current collector and drying the cathode mixture paste, to form a cathode mixture layer on the surface of the cathode current collector.

An embodiment of the present disclosure is a method for manufacturing an all-solid-state lithium ion secondary battery including stacking the cathode manufactured by the above-described method, a solid electrolyte layer including at least a solid electrolyte, and an anode including at least an anode active material.

In the method for manufacturing an all-solid-state lithium ion secondary battery of the present disclosure, the anode active material may include one or more materials selected from the group consisting of silicon, silicon alloy, carbon, aluminum, aluminum alloy, tin and tin alloy.

An embodiment of the present disclosure is a cathode mixture including a cathode active material, a solid electrolyte, and a doping source of lithium, wherein: the cathode active material includes a material that releases and occludes lithium ions; the doping source of lithium includes a conductive assistant and a sulfide that includes Li and S as constituent elements; the doping source of lithium is a material that releases lithium ions at a potential lower than a potential at which the cathode active material releases and occludes lithium ions; and a ratio $Li_1/Li_2$ is in the range of from 0.013 to 0.122, wherein $Li_1$ is the number of lithium ions released from the entirety of the cathode active material at a potential lower than the potential at which the cathode active material releases and occludes lithium ions, and $Li_2$ is the number of lithium ions released from the entirety of the cathode mixture when the potential is in a range of from the potential at which the cathode active material releases and occludes lithium ions to the upper-limit potential.

"Upper-limit potential" means a potential that corresponds to "upper-limit voltage" described later. For example, it may be, in other words, "upper limit of the potential at which the cathode active material can release and occlude lithium ions". The cathode active material might deteriorate at a high potential. The potential at which the cathode active material deteriorates differs depending on the kind of the cathode active material, and therefore the potential may be adequately determined according to the kind of the cathode active material. From this viewpoint, as to the cathode mixture of the present disclosure, it may also be said that the upper-limit potential can take any value depending on the kind of the cathode active material.

An embodiment of the present disclosure is a cathode including a cathode current collector and a cathode mixture layer arranged on a surface of the cathode current collector, wherein the cathode mixture layer is formed of the above-described cathode mixture.

An embodiment of the present disclosure is an all-solid-state lithium ion secondary battery including: a cathode including at least a cathode active material, a sulfide solid electrolyte and a conductive assistant; a solid electrolyte layer at least including a solid electrolyte; and an anode including at least an anode active material, wherein a ratio a/b is in the range of from 0.04 to 0.50, wherein a is a maximum value of dQ/dV of the battery at the first charge when it is in a state ranging between that of an uncharged state and that of when the battery has a voltage less than a lower-limit voltage, and b is a maximum value of dQ/dV of the battery at the first charge when it is in a state ranging between that of when the battery has the lower-limit voltage and that of when the battery has the upper-limit voltage.

The voltage of the battery in "uncharged state" is determined by the difference in potential of each material, created when the cathode and the anode are stacked on each other. "The battery has a voltage less than the lower-limit voltage" can be said in other words, for example "the battery has a voltage less than the voltage at which the cathode active material can release and occlude lithium ions" or "the battery has a voltage less than the lower limit of the use voltage". "The battery has (a voltage no less than) the lower-limit voltage" can be said in other words, for example "the battery has a voltage the same as or higher than the voltage at which the cathode active material can release and occlude lithium ions" or "the battery has a voltage same as or higher than the lower limit of the use voltage". "The battery has (a voltage same as or less than) an upper-limit voltage" can be said in other words, for example "the battery has a voltage the same as or less than the upper limit of the voltage at which the cathode active material can release and occlude lithium ions" or "the battery has a voltage the same as or less than the upper limit of the use voltage". As described above, the upper-limit voltage can have any value depending on the kind of the cathode active material. "dQ/dV" is a value of the charged electric quantity (Q) differentiated with respect to the voltage (V), which is a quantified degree of the electrochemical reaction at each voltage. That is, in the all-solid-state lithium ion secondary battery disclosed in the present application, the electrochemical reaction (release of lithium ions from the cathode) efficiently occurs even when the battery has a voltage less than the lower-limit voltage, that is, even when the battery is in a state ranging between that of an uncharged state and that of when the battery has the use voltage. Therefore, the battery has a value of a/b larger than that of a conventional all-solid-state lithium ion secondary battery.

The anode active material may be constituted by one or more materials selected from the group consisting of silicon, silicon alloy, carbon, aluminum, aluminum alloy, tin and tin alloy.

According to an all-solid-state lithium ion secondary battery provided with the cathode mixture and the cathode manufactured by the methods of the present disclosure, and according to an all-solid-state lithium ion secondary battery provided with the cathode mixture and the cathode of the present disclosure, it is possible to dope the anode with lithium before the battery has the use voltage at the first charge (before the battery has the lower-limit voltage), and as a result, it is possible to make the battery resistance small at a low battery capacity.

BRIEF DESCRIPTION OF DRAWINGS

The following is a brief description of the drawings.

Throughout the drawings, like reference numbers will be understood to refer to like components and structures.

DESCRIPTION OF EMBODIMENTS

1. Method for Manufacturing Cathode Mixture

Figure 1:
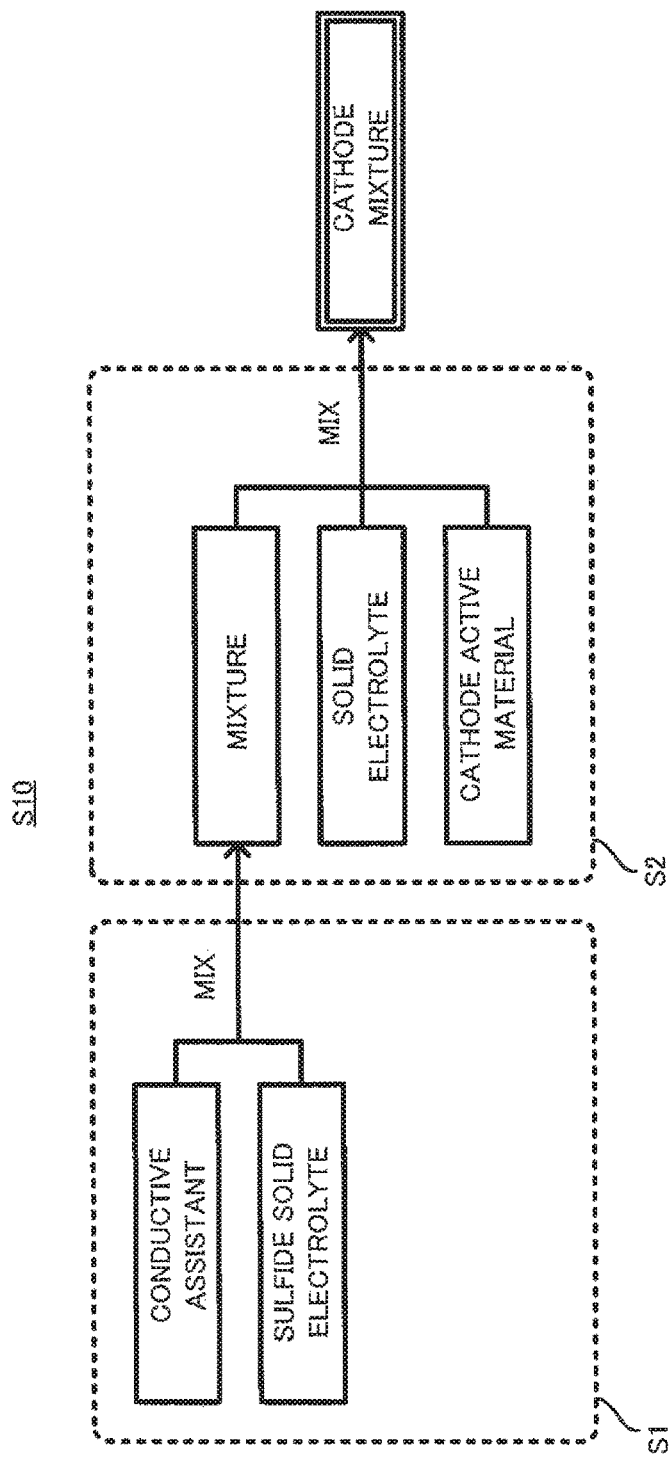
FIG. 1 is a flowchart showing a method for manufacturing a cathode mixture (S10)

A method for manufacturing a cathode mixture (S10) will be explained with reference to FIG. 1. S10 includes a first step (S1) of mixing at least a conductive assistant (C1) and a sulfide solid electrolyte (E1) to obtain a mixture, and a second step (S2) of mixing at least a cathode active material, a solid electrolyte (E2) and the mixture obtained from the first step, to obtain a cathode mixture. Here, the energy added to the sulfide solid electrolyte (E1) in S1 is larger than the energy added to the solid electrolyte (E2) in S2. That is, the components to be mixed are mixed harder in S1 than in S2.

1.1. First Step (S1)

S1 is a step of mixing at least the conductive assistant (C1) and the sulfide solid electrolyte (E1) to obtain a mixture.

1.1.1. Conductive Assistant (C1)

For the conductive assistant (C1), any conductive assistant for lithium ion secondary batteries may be applied. Specifically, a conductive assistant including a carbon material selected from vapor-grown carbon fiber (VGCF), acetylene black (AB), Ketjen black (KB), carbon nanotube (CNT) and carbon nanofiber (CN) may be used. A metal material that can endure the environment during use of the battery may also be used. For the conductive assistant (C1), one conductive assistant may be used alone, or a mixture of two or more conductive assistants may also be used. The shape of the conductive assistant (C1) is not limited as long as the sulfide solid electrolyte (E1) may be easily mixed therewith, and various shapes such as powder form and fiber form may be used.

1.1.2. Sulfide Solid Electrolyte (E1)

For the sulfide solid electrolyte (E1), any sulfide solid electrolyte may be applied as long as it is a solid electrolyte including a sulfide, it is a sulfide solid electrolyte to be used in lithium ion secondary batteries, and it is a material with which the mixture obtained in the first step (S1) releases and occludes lithium at a potential lower than the potential at which the cathode active material releases and occludes lithium. That is, the sulfide solid electrolyte is not limited as long as it includes a solid electrolyte that includes lithium (Li) and sulfur (S) as its constituent elements. Specifically, the solid electrolyte may include Li, A (A is at least one selected from the group consisting of P, Si, Ge, Al and B) and S. Specifically, examples thereof include a solid electrolyte that includes a material selected from $Li_2S$—$SiS_2$, $LiX$—$Li_2S$—$SiS_2$ (X is one or more kind of halogen element, may be one or more halogens selected from I and Br, and may be I. Other solid electrolytes include, $LiX$—$Li_2S$—$P_2S_5$, $LiX$—$Li_2O$—$Li_2S$—$P_2S_5$, $LiX$—$Li_2S$—$P_2O_5$, $LiX$—$Li_3PO_4$—$P_2S_5$, $Li_2S$—$P_2S_5$ and $Li_3PS_4$. For the sulfide solid electrolyte (E1), one kind may be used alone, and a mixture of two or more kinds may also be used. The shape of the sulfide solid electrolyte (E1) is not limited as long as it can be easily mixed with the conductive assistant (C1). Various shapes such as powder form may be used.

1.1.3. Mixing Ratio

The mixing ratio of the conductive assistant (C1) and the sulfide solid electrolyte (E1) in S1 is not particularly limited, and the sulfide solid electrolyte (E1) in an amount of from 200 pts. by mass to 1600 pts. by mass may be mixed per 100 pts. by mass of the conductive assistant (C1). The larger the amount of the sulfide solid electrolyte (E1) is, the more the amount of lithium ions that can be theoretically released increases. However, if the amount of the conductive assistant (C1) is too small, the amount of lithium ions that can be actually released decreases. By having such a range of mixing ratio of the conductive assistant (C1) and the sulfide solid electrolyte (E1), it is possible to obtain a mixture that can further efficiently release lithium ions at a low voltage.

1.1.4. Other Component

The mixture may include optional components, in addition to the conductive assistant (C1) and the sulfide solid electrolyte (E1). For example, when the mixture of the conductive assistant (C1) and the sulfide solid electrolyte (E1) are obtained in S1 by a wet method, the mixture may include a solvent. It is noted that the solid content that constitutes the mixture may be from the solid content originated from the conductive assistant (C1) and from the solid content originated from the sulfide solid electrolyte (E1).

1.1.5. Mixing Method in First Step (S1)

The energy added to the sulfide solid electrolyte (E1) in S1 is larger than the energy added to the solid electrolyte (E2) in S2. The addition of a large amount of energy applied to the sulfide solid electrolyte (E1) in S1 changes the property of the sulfide solid electrolyte (E1) (for example, the crystallinity decreases). The mixture obtained in this way can release lithium ions at a low voltage. The voltage at which the mixture releases lithium ions is less than the use voltage of the battery (voltage at which the cathode active material can release and occlude lithium ions, for example over 3.0 V).

A sulfide solid electrolyte included in a conventional cathode mixture is not used for release and occlusion of lithium ions, but for securement of the lithium ion conductivity. Thus, in a conventional way, the sulfide solid electrolyte was mixed by a weak dispersion force in manufacturing a cathode mixture, in order not to degrade the lithium ion conductivity of the sulfide solid electrolyte. In contrast, in the manufacturing method S10, a large amount of energy is purposely added to the sulfide solid electrolyte (E1) and the property of the sulfide solid electrolyte (E1) is changed as described above, in order to use the sulfide solid electrolyte (E1) as a releasing source of lithium ion (doping source of lithium to the anode), which is one characteristic of the manufacturing method S10.

The mixing method used in S1 is not particularly limited as long as a large energy can be added to the sulfide solid electrolyte (E1) in mixing the conductive assistant (C1) and the sulfide solid electrolyte (E1). For example, by mechanically mixing the conductive assistant (C1) and the sulfide solid electrolyte (E1) by means of a mechanical energy adding means such as various mills such as ball mills, bead mills and hammer mills, and various stirring devices such as rotary vane, a large energy can be easily given to the sulfide electrolyte (E1) in mixing. A ball mill, or a planetary ball mill may be used to mix the conductive assistant (C1) and the sulfide solid electrolyte (E1). With a ball mill, it is possible to efficiently add the energy to the sulfide solid electrolyte (E1), and the control is easy.

When the conductive assistant (C1) and the sulfide solid electrolyte (E1) are mechanically mixed in S1, part of the mechanical energy is converted to heat energy. In other words, by observing and controlling the heat energy, it is possible to control the energy to be added to the sulfide solid electrolyte (E1).

The components to be mixed may be mixed by a wet method or a dry method in S1. A dry method may be employed because, with the method, energy can be efficiently added to the sulfide solid electrolyte (E1) and there is no need of solvent removal and the like.

1.1.6. Form of Mixture Obtained by S1

The mixture is obtained at least from the above-described conductive assistant (C1) and sulfide solid electrolyte (E1) mixed with each other. The mixture may take various forms according to the form of the conductive assistant (C1) and the sulfide solid electrolyte (E1) before the mixing. In view of easy mixing with the cathode active material etc. in the second step, the mixture may be in a powder form.

In addition, as described above, a large amount of energy is added to the sulfide solid electrolyte (E1) in S1. Thus, the property of the sulfide solid electrolyte (E1) is changed before and after the mixing. For example, in S1, it is preferable that the crystallinity of the sulfide solid electrolyte (E1) decreases by the mixing of the conductive assistant (C1) and the sulfide solid electrolyte (E1). It is considered that this is because the sulfide solid electrolyte whose crystallinity is decreased is more preferable as a releasing source of lithium ion (doping source). It is noted that one skilled in the art can easily confirm the presence and absence of the decrease of the crystallinity of the sulfide solid electrolyte (E1) by confirming the diffraction peak intensity by powder X-ray diffraction.

1.2. Second Step (S2)

S2 is a step of mixing at least a cathode active material, a solid electrolyte (E2) and the above-described mixture to obtain a cathode mixture.

1.2.1. Cathode Active Material

For the cathode active material, a material that can release and occlude lithium ions may be adequately selected. A material that releases lithium ions at a potential of over 3.0 V on the basis of lithium electrode potential and occludes lithium ions at a potential of over 3.0 V on the basis of lithium electrode potential may be used. Examples of such a cathode active material include: lithium cobaltate ($LiCoO_2$); lithium nickelate ($LiNiO_2$); lithium manganate ($LiMn_2O_4$); $LiNi_{1/3}Mn_{1/3}Co_{1/3}O_2$; different kinds of element substituent Li—Mn spinel represented by $Li_{1+x}Mn_{2-x-y}M_yO_4$ (M is one or more selected from the group consisting of Al, Mg, Co, Fe, Ni and Zn); lithium titanate ($Li_xTiO_y$); lithium metal phosphate ($LiMPO_4$, M is one or more selected from the group consisting of Fe, Mn, Co and Ni). For the cathode active material, one cathode active material may be used alone, or a mixture of two or more cathode active materials may also be used. The primary particle diameter of the cathode active material may be in the range of from 1 nm to 100 μm. The lower limit may be no less than 10 nm, may be no less than 100 nm, and may be no less than 500 nm. The upper limit may be no more than 30 μm, and may be no more than 10 μm. The cathode active material may form a secondary particle in which the primary particles are gathered or agglomerated. In this case, the particle diameter of the secondary particle is, though not particularly limited, normally in the range of from 3 μm to 50 μm. The lower limit may be no less than 4 μm. The upper limit may be no more than 20 μm. With these ranges of the particle diameter of the cathode active material, it is possible to obtain a cathode mixture and a cathode that further provide excellent ion conductivity and electron conductivity.

The cathode active material may be coated with a lithium ion conductive oxide. This is because, with the coating, a high resistance layer becomes difficult to form on the interface between the cathode active material and the solid electrolyte (E2) (especially the sulfide solid electrolyte (E3)), therefore it becomes easy to prevent the increase of the battery resistance. Examples of the lithium ion conductive oxide that coats the cathode active material include an oxide represented by the general formula $Li_xAO_y$ (A is B, C, Al, Si, P, S, Ti, Zr, Nb, Mo, Ta or W, x and y are each a positive number). Specifically, $LiNbO_3$, $Li_4Ti_5O_{12}$, $Li_3PO_4$ and the like may be used. When a lithium ion conductive oxide coats the surface of the cathode active material, it only has to coat at least part of the cathode active material, and may coat the whole surface of the cathode active material. The method for coating the surface of the cathode active material with a lithium ion conductive oxide is not particularly limited, and any known methods may be employed. The thickness of the lithium ion conductive oxide that coats the cathode active material may be, for example, in the range of from 0.1 nm to 100 nm, and may be in the range of from 1 nm to 20 nm.

In the present application, there is no need that the cathode active material be formed "only" of a material that releases lithium ions at a potential of over 3.0 V on the basis of lithium electrode potential and occludes lithium ions at a potential of over 3.0 V on the basis of lithium electrode potential. The cathode active material may include a material that releases lithium ions at a potential of no more than 3.0 V on the basis of lithium electrode potential and occludes lithium ions at a potential of no more than 3.0 V on the basis of lithium electrode potential. However, in view of providing a more remarkable effect, where the whole material that constitutes the cathode active material is 100 mass %, the material that releases lithium ions at a potential of over 3.0 V on the basis of lithium electrode potential and occludes lithium ions at a potential of over 3.0 V on the basis of lithium electrode potential may account for no less than 50 mass %, and may account for no less than 90 mass %.

It is noted that, in the present application, the above-described "mixture" and "cathode active material" are different from each other. That is, in the present application, the above-described "mixture" is not converted as the material that constituents "cathode active material".

1.2.2. Solid Electrolyte (E2)

The solid electrolyte (E2) only has to be an electrolyte that has lithium ion conductivity. Examples thereof include the sulfide solid electrolyte (E3) and an oxide solid electrolyte (E4). Specifically, the sulfide solid electrolyte (E3) may be used as the solid electrolyte (E2). The sulfide solid electrolyte (E3) may be adequately selected from the examples of the sulfide solid electrolyte (E1). The sulfide solid electrolyte (E1) and the sulfide solid electrolyte (E3) may be the same sulfide solid electrolyte.

1.2.3. Mixing Ratio

The mixing ratio of the cathode active material, the solid electrolyte (E2) and the mixture in S2 is not particularly limited. For example, setting the entirety of the cathode mixture as 100 mass % in terms of solid content, the cathode active material may account for no less than 50 mass %, and may account for no less than 60 mass %. The upper limit is not particularly limited, and may be adjusted depending on the total amount of the components other than the cathode active material.

Setting the entirety of the cathode mixture as 100 mass % in terms of solid content, the solid electrolyte may account for no less than 5 mass %, and may account for no less than 10 mass %. The upper limit may be no more than 50 mass %, may be no more than 40 mass %, and may be no more than 20 mass %.

Setting the entirety of the cathode mixture as 100 mass % in terms of solid content, the mixture may account for 1.7 mass % to 9.2 mass %. The larger the amount of the mixture in the entirety of the cathode mixture is, the more the amount of lithium ions that can be released to the anode increases. Thus, the resistance of the anode becomes small and the durability and the like is improved. Meanwhile, the amounts of the cathode active material and the solid electrolyte relatively decrease, and therefore the resistance of the cathode becomes large.

1.2.4. Other Component

The cathode mixture may include a conductive assistant and a binder, for the purpose of improvements in conductivity and formability. That is, in S2, a conductive assistant (C2) and a binder may be mixed, in addition to the above-described cathode active material, the solid electrolyte (E2) and the mixture. Further, depending on the case, other additives such as thickening agent may also be mixed. The conductive assistant (C2) may be adequately selected from the examples of the conductive assistant (C1). As the binder, any known binder for a cathode mixture including a solid electrolyte may be used. Examples of binders include acrylonitrile-butadiene rubber (ABR), butadiene rubber (BR), polyvinylidene fluoride (PVDF), styrene butadiene rubber (SBR), and polytetrafluoroethylene (PTFE). The amounts of the conductive assistant (C2) and the binder present in the cathode mixture are not particularly limited, and are adequately determined depending on the objective performances.

1.2.5. Mixing Method in Second Step (S2)

In S2, the mixing needs to be carried out with a small amount of energy, in order not to break the cathode active material and its coating layer and to keep the lithium ion conductivity of the solid electrolyte (E2) as described above. That is, the energy added to the solid electrolyte (E2) in S2 is smaller than the energy added to the sulfide solid electrolyte (E1) in S2.

The mixing method used in S2 is not particularly limited as long as the cathode active material, the solid electrolyte (E2), the mixture and other optional components are mixed and dispersed with each other. The cathode active material, the solid electrolyte (E2), the mixture and other optional components can be mixed and dispersed with each other, for example by means of various types of mixing/dispersing apparatuses such as ultrasonic dispersing apparatus, shaking apparatus, FILMIX (registered trademark), and continuous extrusion machine.

The mixing in S2 may be carried out by a wet method or a dry method. In view of uniformly and efficiently mixing each component, a wet method may be used. That is, the cathode active material, the solid electrolyte (E2), the mixture and other optional components may be dispersed in a solvent. The solvent to be used in this case is not particularly limited, and a non-polar solvent may be used.

As described above, according to S10 including S1 and S2, it is possible to manufacture a cathode mixture that includes a predetermined mixture. When a cathode is made with such a cathode mixture and an all-solid-state lithium ion secondary battery is made with the cathode, lithium ions are released from the mixture in the cathode mixture at a low battery voltage at the first charge of the all-solid-state lithium ion secondary battery, whereby it is possible to dope the anode with lithium from the cathode. As a result, it is possible to lower the battery resistance at a low battery capacity.

1.3. Supplemental

As described above, one characteristic of the method for manufacturing a cathode mixture of the present disclosure is that energy stronger than before is added to the sulfide solid electrolyte in the first step. Such a strong energy may be added for example by a ball mill. In this view point, the method for manufacturing a cathode mixture of the present disclosure may be specified as follows.

That is, the method for manufacturing a cathode mixture of the present disclosure includes a first step of mixing at least a conductive assistant (C1) and a sulfide solid electrolyte (E1) to obtain a mixture, and a second step of mixing at least a cathode active material, a solid electrolyte (E2) and the mixture to obtain a cathode mixture, wherein in the first step, the conductive assistant (C1) and the sulfide solid electrolyte (E1) are mechanically mixed by a ball mill, and the mixture obtained in the first step is a material that releases lithium ions at a potential lower than a potential at which the cathode active material releases and occludes lithium ions.

2. Method for Manufacturing a Cathode

A cathode may be manufactured by arranging the above-described cathode mixture on a surface of the cathode current collector. The manufacturing method of the cathode may be the same as a conventional method, except that the above cathode mixture is used as the cathode mixture. The cathode may be manufactured by either a wet method or a dry method. Hereinafter, a case in which the cathode is manufactured by a wet method will be described.

Figure 2:
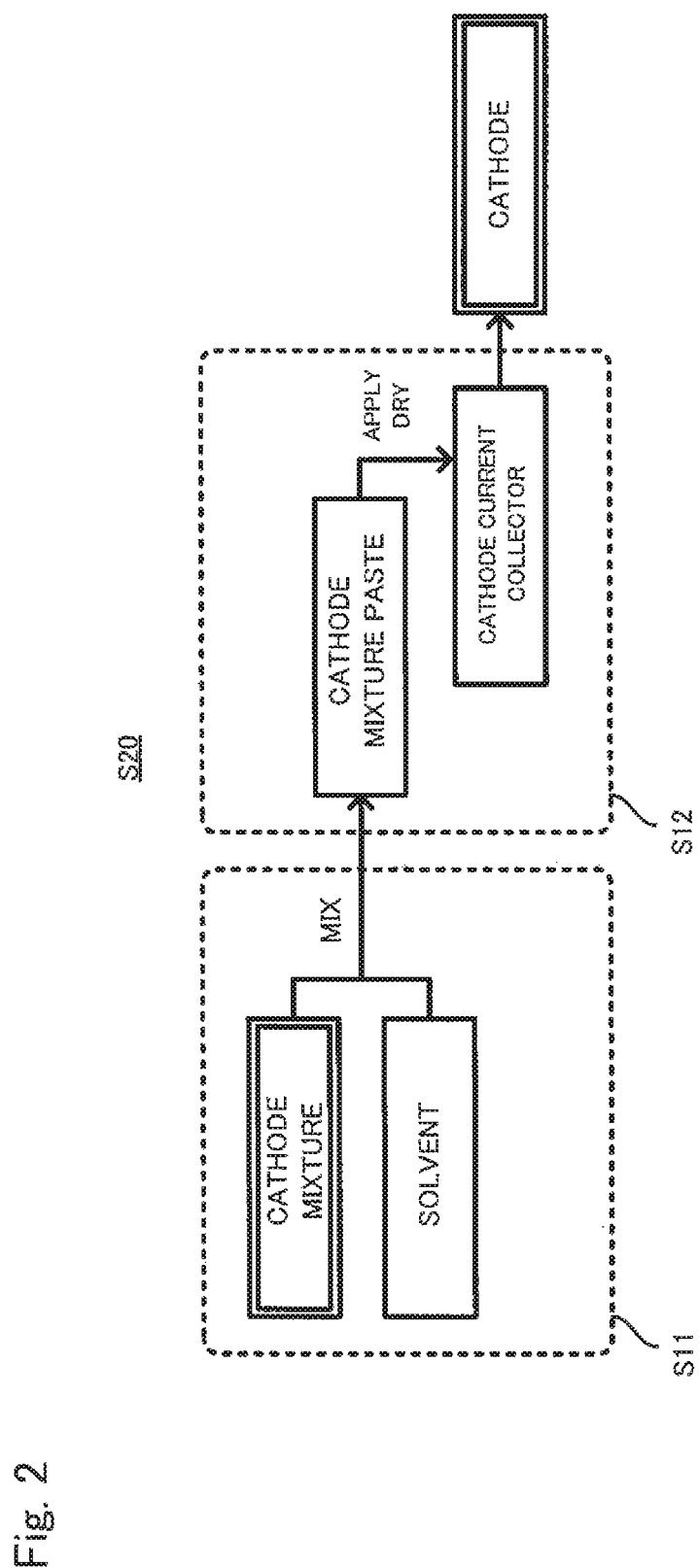
FIG. 2 is a flowchart showing a method for manufacturing a cathode (S20)

A method for manufacturing a cathode (S20) will be described with reference to FIG. 2. S20 includes a paste making step (S11) of obtaining a cathode mixture paste that includes the above-described cathode mixture and a solvent, and a cathode mixture layer formation step (S12) of applying the cathode mixture paste on a surface of a cathode current collector and drying it to form a cathode mixture layer on the surface of the cathode current collector.

2.1. Paste Making Step (S11)

S11 is a step of obtaining a cathode mixture paste that includes the above-described cathode mixture and a solvent. For example, the cathode mixture paste may be obtained by mixing and dispersing the cathode mixture in a solvent. The solvent used in this case is not particularly limited, and adequately selected depending on the properties of the cathode active material, the solid electrolyte and the like. For example, a non-polar solvent such as heptane may be used. For the mixing and dispersion of the cathode mixture and the solvent, various types of mixing/dispersing apparatuses such as ultrasonic dispersing apparatus, shaking apparatus, and FILMIX (registered trademark) may be used. The solid content in the cathode mixture paste is not particularly limited.

2.2. Cathode Mixture Layer Formation Step (S12)

S12 is a step of applying the cathode mixture paste on a surface of the cathode current collector and drying it, to form a cathode mixture layer on the surface of the cathode current collector.

As the cathode current collector, a known metal that can be used as a current collector of lithium ion secondary batteries may be used. Examples of such a metal include a metal material including one or two or more metals selected from the group consisting of Cu, Ni, Al, V, Au, Pt, Mg, Fe, Ti, Co, Cr, Zn, Ge and In. The form of the cathode current collector is not particularly limited, and various forms such as foil and mesh may be used.

As a method for applying the cathode paste on a surface of the cathode current collector, a known method such as doctor blade may be used. The total thickness of the cathode mixture layer and the cathode current collector after dry (thickness of the cathode) is not particularly limited, and for example may be in the range of from 0.1 µm to 1 mm, and in another embodiment may be in the range of from 1 µm to 100 µm. The cathode may be manufactured optionally via a process of pressing. The pressure in pressing the cathode may be around 100 MPa.

3. Method for Manufacturing All-Solid-State Lithium Ion Secondary Battery

Figure 3:
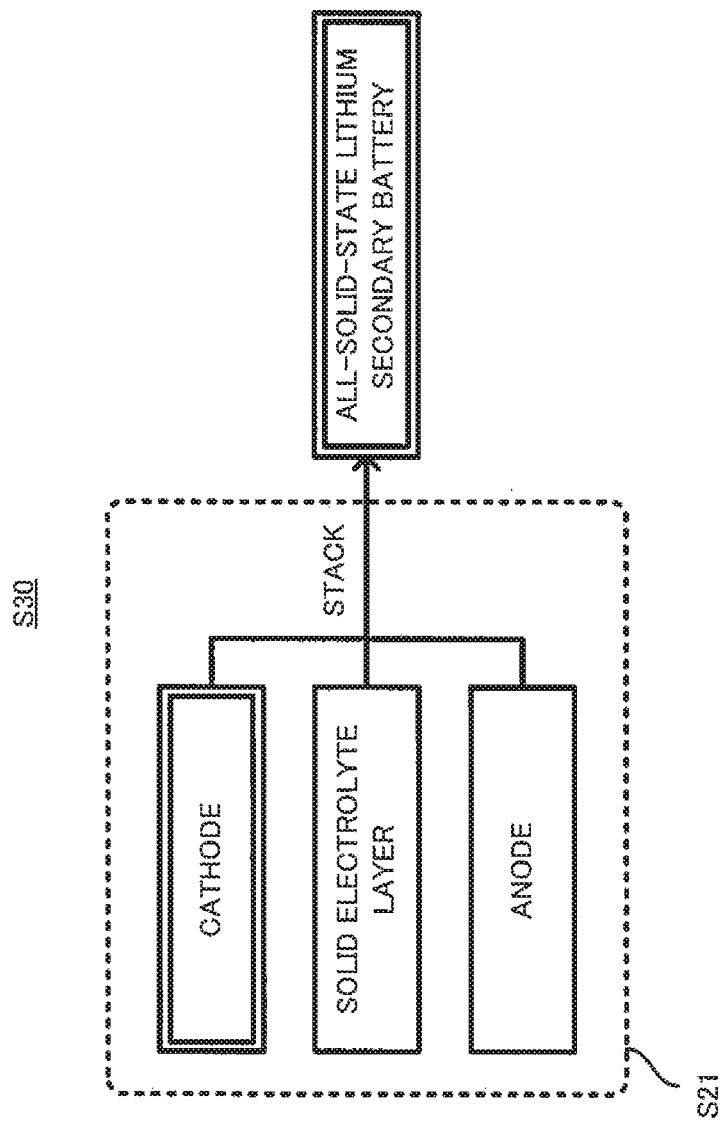
FIG. 3 is a flowchart showing a method for manufacturing an all-solid-state lithium ion secondary battery (S30)

The method for manufacturing an all-solid-state lithium ion secondary battery (S30) will be explained with reference to FIG. 3. S30 includes a stacking step (S21) of stacking: the above-described cathode; a solid electrolyte layer that includes at least a solid electrolyte; and an anode that includes at least an anode active material.

3.1. Solid Electrolyte Layer

The solid electrolyte layer includes at least a solid electrolyte. In view of providing flexibility and the like, the solid electrolyte layer may optionally include a binder. The solid electrolyte may be adequately selected from the examples of the above-described solid electrolyte (E2). The binder may be adequately selected from the examples of the above-described binder that can be contained in the above-described cathode mixture. There is no need to use the same solid electrolyte and binder contained in the cathode for the solid electrolyte layer. However, it is better to unify the materials in view of productivity. The content of the solid electrolyte in the solid electrolyte layer may be no less than 60 mass %, and in another embodiment may be no less than 70 mass %, and in a further embodiment may be no less than 80 mass %, for example.

The solid electrolyte layer may be manufactured via a process of pressing a solid electrolyte, for example. The solid electrolyte layer may also be manufactured via a process of applying a solid electrolyte paste adjusted by dispersion of a solid electrolyte and the like in a solvent, onto a surface of a base material or a surface of an electrode. The solvent used in this case is not particularly limited, and may be adequately selected depending on the properties of the binder and the solid electrolyte. The thickness of the solid electrolyte layer may be in the range of from 0.1 µm to 1 mm, and in another embodiment may be in the range of from 1 µm to 100 µm for example, though largely depending on the structure of the battery.

3.2. Anode

The anode includes at least an anode active material. In view of improving the lithium ion conductivity, the anode may optionally include a solid electrolyte. The anode may also optionally include a conductive assistant in order to improve the conductivity. Further, the anode may also optionally include a binder to provide flexibility and the like. For the solid electrolyte, the conductive assistant and the binder, the same solid electrolyte, conductive assistant and binder that are already explained may be used. The mass ratio of each component is not particularly limited.

For the anode active material, any known anode active material for lithium ion secondary batteries may be used. However, in S30, the anode active material may be formed of one or more materials selected from the group consisting of silicon, silicon alloy, carbon, aluminum, aluminum alloy, tin and tin alloy. This is because, with these materials, the effect provided from doping with lithium ions described above (lowering the battery resistance at a low battery capacity) is further remarkably obtained. In view of making the effect further remarkable, among them, an anode active material formed of silicon or silicon alloy may be used. Considering the performance as the entirety of the all-solid-state lithium ion secondary battery, an anode active material formed of a carbon material may also be used.

The anode may be manufactured for example by a process of: adding the anode active material etc. in a solvent; thereafter dispersing the components by means of an ultrasonic dispersing apparatus etc., to form an anode paste; then applying the anode paste on a surface of an anode current collector; and thereafter drying the anode paste. The solvent used in this case is not particularly limited, and may be adequately selected depending on the properties of the anode active material and the like. As the anode current collector, a known metal that can be used as a current collector of lithium ion secondary batteries may be used. Examples of such metals include a metal material including one or two or more metals selected from the group consisting of Cu, Ni, Al, V, Au, Pt, Mg, Fe, Ti, Co, Cr, Zn, Ge and In. The form of the anode current collector is not particularly limited, and various forms such as foil and mesh may be used. The thickness of the anode may be in the range of from 0.1 µm to 1 mm, and in another embodiment may be in the range of from 1 µm to 100 µm, for example. The anode may be manufactured via a process of pressing. The pressure in pressing the anode may be no less than 200 MPa, and in another embodiment may be around 400 MPa.

In S30, an all-solid-state lithium ion secondary battery may be manufactured via a step of stacking the above-described cathode, solid electrolyte layer and anode. After the cathode, the solid electrolyte layer and the anode are stacked, they may be optionally pressed to be integrated. Needless to say, the cathode, the solid electrolyte layer and the anode stacked together are accommodated in a battery case, with a terminal and the like connected to them.

"Manufacturing methods" of the cathode mixture, cathode and all-solid-state lithium ion secondary battery of the present disclosure are explained above. Hereinafter, the aspects of the cathode mixture, cathode and all-solid-state lithium ion secondary battery of the present disclosure as "products" will be explained.

4. Cathode Mixture

As described above, one characteristic of the cathode mixture of the present disclosure compared to a conventional cathode mixture is that it contains a predetermined mixture.

The cathode mixture of the present disclosure can release lithium ions from the mixture at a low potential, which makes it possible to dope the anode with lithium. That is, the mixture may be a doping source of lithium, in other words. In this viewpoint, the cathode mixture of the present disclosure may be specified as follows in terms of performance. That is, the cathode mixture of the present disclosure includes at least a cathode active material, a solid electrolyte, and a doping source of lithium, wherein the cathode active material includes a material that releases and occludes lithium ions, the doping source of lithium includes a conductive assistant and a sulfide that includes Li and S as its constituent elements, the doping source of lithium is a material that releases lithium ions at a potential lower than a potential at which the cathode active material releases and occludes lithium ions, and a ratio $Li_1/Li_2$ is in the range of from 0.013 to 0.122, wherein Li' is the number of the lithium ions released from the entirety of the cathode mixture at a potential lower than the potential at which the cathode active material releases and occludes lithium ions, and $Li_2$ is the number of the lithium ions released from the entirety of the cathode mixture when the potential is in a range of from the potential at which the cathode active material releases and occludes lithium ions to the upper-limit potential.

"Upper-limit potential" is a potential that corresponds to "upper-limit voltage" described later. For example, the upper-limit potential may be the "upper limit of the potential at which the cathode active material can release and occlude lithium ions" in other words. It can also be said, in the cathode mixture of the present disclosure, that the upper-limit potential may take any value depending on the kind of the cathode active material. The value of the upper-limit potential can depend of the selected cathode active material.

For the details of the components contained in the cathode mixture of the present disclosure when the cathode mixture is specified in terms of performance, what is explained in the above manufacturing method S10 may be applied as they are. That is, in addition to the cathode active material and the sulfide solid electrolyte, the cathode mixture may include other solid electrolyte (e.g. oxide solid electrolyte), a conductive assistant and a binder.

5. Cathode

One characteristic of the cathode of the present disclosure is that the cathode includes a cathode current collector and a cathode mixture layer that includes the above cathode mixture. For example, the cathode of the present disclosure includes the cathode current collector and the cathode mixture layer arranged on a surface of the cathode current collector, and the cathode mixture layer is formed of the above cathode mixture.

In the cathode of the present disclosure, for the details of the cathode mixture layer and the cathode current collector, what is explained in the above manufacturing method S10 and S20 may be applied as they are.

6. All-Solid-State Lithium Ion Secondary Battery

As described above, in the all-solid-state lithium ion secondary battery of the present disclosure, an electrochemical reaction of the battery (release of lithium ions from the cathode) occurs at a low voltage that is less than the use voltage of the battery (less than the lower-limit voltage of the battery, for example less than 3.0 V) at a first charge, and the anode may be doped with lithium before the battery reaches the use voltage. Such a battery may be specified by a ratio of a and b (a/b) defined below.

a: maximum value of dQ/dV of the battery at the first charge ranges between that of an uncharged state and that of when the battery has a voltage less than the lower-limit voltage b: maximum value of dQ/dV of the battery at the first charge ranges between that of when the battery has the lower-limit voltage and that of when the battery has the upper-limit voltage The voltage of the battery in "uncharged state" is determined by the difference in potential of each material, created when the cathode and the anode are stacked on each other. "The battery has a voltage less than the lower-limit voltage" can be said in other words, for example "the battery has a voltage less than the voltage at which the cathode active material can release and occlude lithium ions" or "the battery has a voltage less than the lower limit of the use voltage". "The battery has (a voltage no less than) the lower-limit voltage" can be said in other words, for example "the battery has a voltage the same as or higher than the voltage at which the cathode active material can release and occlude lithium ions" or "the battery has a voltage same as or higher than the lower limit of the use voltage". The lower-limit voltage may be 3.0 V for example. "The battery has (a voltage the same as or less than) an upper-limit voltage" can be said in other words, for example "the battery has a voltage the same as or less than the upper limit of the voltage at which the cathode active material can release and occlude lithium ions" or "the battery has a voltage the same as or less than the upper limit of the use voltage". The upper-limit voltage may be a voltage of no more than 6.0 V, and in another embodiment may be a voltage in a range of from 4.0 V to 5.0 V, for example. "dQ/dV" is a value of the charged electric quantity (Q) differentiated with respect to the voltage (V), which is a quantified degree of the electrochemical reaction at each voltage. That is, in the all-solid-state lithium ion secondary battery disclosed in the present application, the electrochemical reaction (release of lithium ions from the cathode) efficiently occurs even when the battery has a voltage less than the use voltage (lower-limit voltage of the battery). Therefore, the battery has a value of a/b larger than that of a conventional all-solid-state lithium ion secondary battery.

As a result of intensive research, the inventors of the present disclosure found that it is possible to further lower the battery resistance at a low battery capacity of an all-solid-state lithium ion secondary battery whose value of the above a/b is within a predetermined range. That is, the all-solid-state lithium ion secondary battery of the present disclosure includes a cathode that includes at least a cathode active material, a sulfide solid electrolyte and a conductive assistant, a solid electrolyte layer that includes at least a solid electrolyte, and an anode that includes at least an anode active material, wherein the ratio of a and b (a/b) defined above is in the range of from 0.04 to 0.50.

For the details of the cathode, the solid electrolyte layer and the anode in the all-solid-state lithium ion secondary battery of the present disclosure, what is explained in the manufacturing methods of S10, S20 and S30 described above can be applied as they are.

Figure 4:
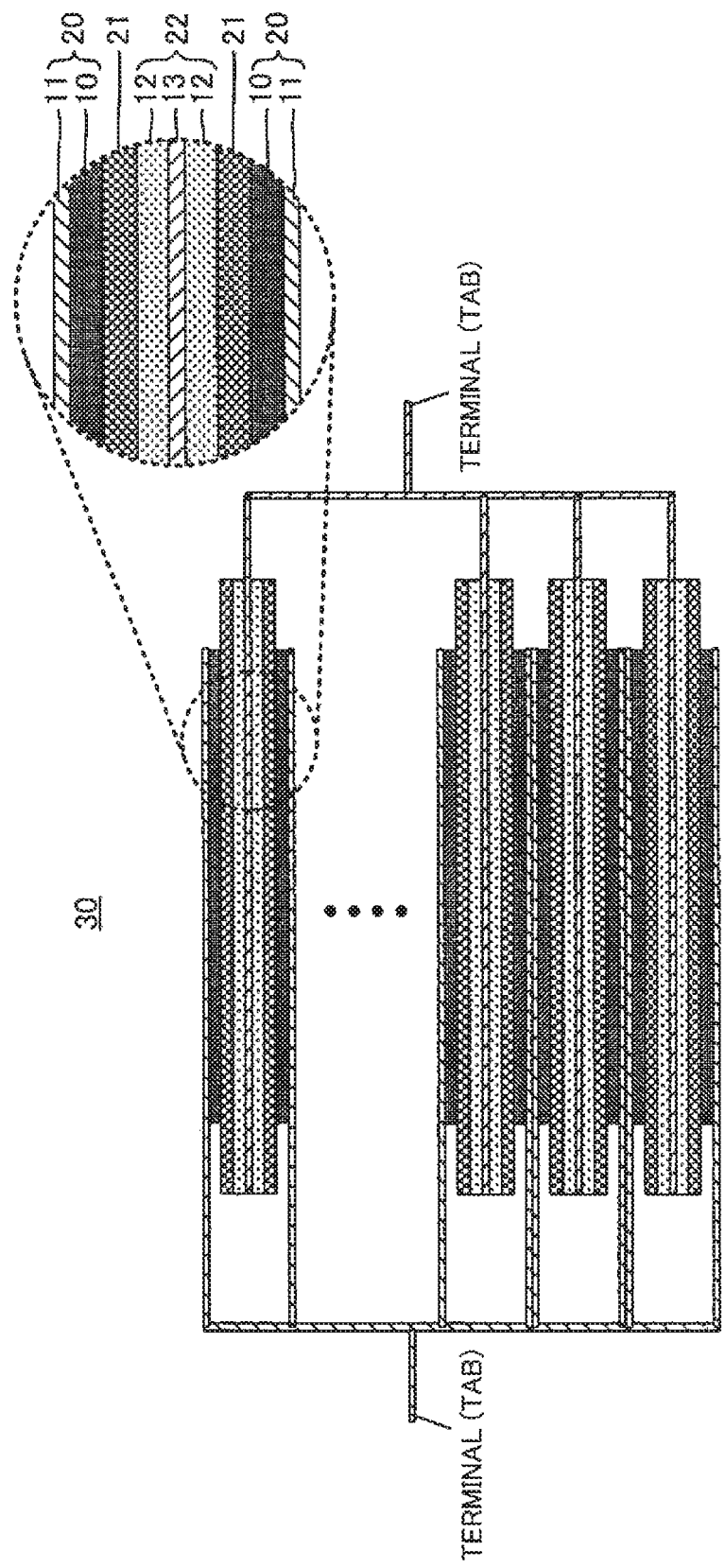
FIG. 4 is a view to explain a layer structure of an all-solid-state lithium ion secondary battery 30, which is one example of an all-solid-state lithium ion secondary battery.

One example of the layer structure of the all-solid-state lithium ion secondary battery of the present disclosure will be explained with reference to FIG. 4. As shown in FIG. 4, an all-solid-state lithium ion secondary battery 30 includes a cathode 20, a solid electrolyte layer 21 and an anode 22. The cathode 20 includes a cathode current collector 11 and a cathode mixture layer 10 that includes at least a cathode active material, a sulfide solid electrolyte and a conductive assistant. The solid electrolyte layer 21 includes at least a solid electrolyte. The anode 22 includes an anode current collector 13 and an anode mixture layer 12 that includes at least an anode active material. The all-solid-state lithium ion secondary battery 30 includes a plurality of single batteries each including the cathode 20, the solid electrolyte layer 21 and the anode 22 that are stacked together in the order mentioned. The plurality of single batteries have an electrical parallel connection by a cathode current collector 11 projected from an end of each battery and connected to each other and an anode current collector 13 projected from an end of each battery and connected to each other. Electricity can be taken out via the terminals (tabs).

The all-solid-state lithium ion secondary battery of the present disclosure may be provided with one single battery that satisfies the above a/b, or may be provided with a plurality of single batteries that satisfy the above a/b. In the all-solid-state lithium ion secondary battery of the present disclosure, the plurality of single batteries may have a parallel connection, or may have a series connection. When the all-solid-state lithium ion secondary battery is provided with a plurality of single batteries like the all-solid-state lithium ion secondary battery 30 of the present disclosure, the all-solid-state lithium ion secondary battery belongs to the technical scope of the all-solid-state lithium ion secondary battery of the present disclosure when at least one of the plurality of single batteries satisfies the above a/b.

7. Use Method of All-Solid-State Lithium Ion Secondary Battery

As described above, the all-solid-state lithium ion secondary battery of the present disclosure has a function to dope the anode with lithium from the cathode at a low battery voltage at the first charge. This makes it possible to lower the battery resistance at a low battery capacity. Such an all-solid-state lithium ion secondary battery may be used in a state that charge and discharge are repeated with a high voltage kept.

Figure 5A:
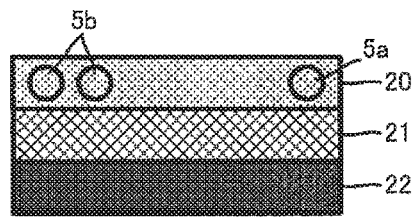
FIGS. 5A to 5F are views to explain the movement of lithium ions in an all-solid-state lithium ion secondary battery at the first charge and the charges and discharges after the first charge.
Figure 5B:
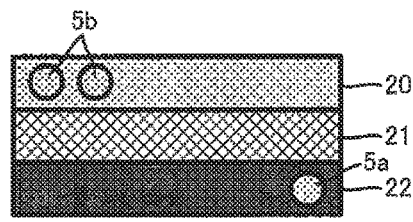
Figure 5C:
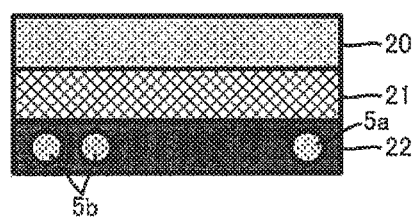
Figure 5D:
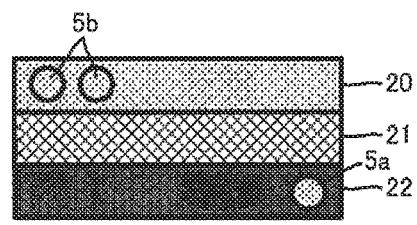
Figure 5E:
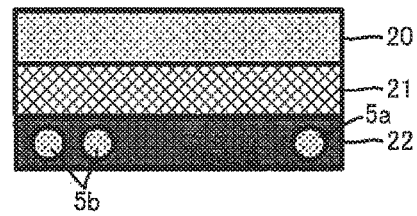
Figure 5F:
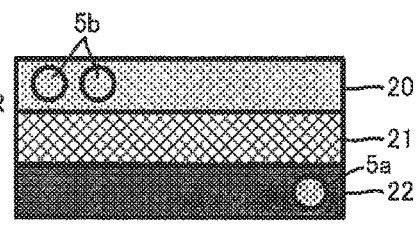

The method of use of the all-solid-state lithium ion secondary battery of the present disclosure will be explained with reference to FIGS. 5A to 5F. As shown in FIGS. 5A to 5F, the all-solid-state lithium ion secondary battery of the present disclosure is, at the first charge, charged to a lower-limit voltage (e.g. 3.0 V) from an uncharged state and thereafter charge and discharge are repeated in a manner that the voltage does not become less than the lower-limit voltage, in use. Specifically, the first charge is carried out to the all-solid-state lithium ion secondary battery in an uncharged state (FIG. 5A). Here, the lithium ions that transfer from the cathode 20 to the anode 22 are sorted into two kinds of lithium ion 5a that is released from the mixture and lithium ion 5b that is released from the cathode active material. In the all-solid-state lithium ion secondary battery of the present disclosure, at a low battery voltage under the lower-limit voltage, the lithium ion 5a is released from the mixture first, and reaches the anode 22 via the solid electrolyte layer 21 (FIG. 5B). This makes it possible to dope the anode 22 with lithium. When the charge is continued and the battery voltage reaches a potential at which the cathode active material releases lithium ions (lower-limit voltage), the lithium ion 5b is released from the cathode active material, and reaches the anode 22 via the solid electrolyte layer 21 (FIG. 5C). After that, the charge is carried out until the battery has a predetermined upper-limit voltage. When the battery is discharged, the battery voltage is controlled not to become less than the lower-limit voltage (FIG. 5D), and when the battery voltage reaches a predetermined voltage that is no less than the lower-limit voltage, the battery is charged again to have a voltage that is no more than the upper-limit voltage (FIG. 5E), and thereafter discharged (FIG. 5F). As described, in the all-solid-state lithium ion secondary battery of the present disclosure, charge and discharge are repeated after the first charge is completed, in a manner that the anode 22 is always doped with the lithium ion 5a (lithium 5a) after the first charge, which makes it possible to lower the battery resistance at a low battery capacity.

EXAMPLES

1. Manufacture of Cathode Mixture

As described below, cathode mixtures according to Examples 1 to 6 and
Comparative Examples 1 and 2 were obtained.

Example 1

(Manufacture of Mixture (First Step))

A mixture was obtained by mixing at least one conductive assistant (C1) and a sulfide solid electrolyte (E1) by a planetary ball mill (Pulverisette P-7, manufactured by Fritsch GmbH). The details are as follows.

In a 45 ml pot, the conductive assistant (C1) and the sulfide solid electrolyte (E1) in an amount of 750 g in total, and 65 g of zirconia balls (diameter: 5 mm) were placed. A lid was placed on the pot. The pot was installed in the planetary ball mill. Mixing was carried out at 370 rotations/min of rotation rate. After a 5-hour mixing, the content of the pot was collected and the zirconia balls and the solvent were removed, whereby, a mixture was obtained.

In Example 1, vapor-grown carbon fiber (VGCF) was used as the conductive assistant (C1) and $Li_2S-P_2S_5-LiI-LiBr$ ($Li_2S:P_2S_5:LiI:LiBr=75:25:10:15$ (mol ratio)) was used as the sulfide solid electrolyte (E1). The mixing ratio of C1 and E1 was C1:E1=1:8 by mass.

(Manufacture of Cathode Mixture (Cathode Mixture Paste) (Second Step))

At least a cathode active material, a solid electrolyte (E2) and the above mixture were mixed by means of an ultrasonic dispersing apparatus (UH50, manufactured by SMT Co., LTD., hereinafter the same is applied) and a shaking apparatus (TTM-1, manufactured by SHIBATA SCIENTIFIC TECHNOLOGY LTD., hereinafter the same is applied), whereby a cathode mixture was obtained. The details are as follows.

Heptane, a butyl butyrate solution containing 5 mass % of a PVdF-based binder, $LiNi_{1/3}Co_{1/3}Mn_{1/3}O_2$ having an average particle diameter of 6 μm as the cathode active material, $LiI-Li_2S-P_2S_5$ based glass ceramic (sulfide solid electrolyte (E3)) having an average particle diameter of 0.8 μm as the solid electrolyte (E2), VGCF as the conductive assistant (C2) and the above mixture were added in a polypropylene container, and stirred for 30 seconds by the ultrasonic dispersing apparatus. Next, the container was shaken for 3 minutes by the shaking apparatus, and further stirred by the ultrasonic dispersing apparatus for 30 seconds under the same conditions as above, whereby a cathode mixture paste according to Example 1 was obtained. The mixture had a solid content of 6.2 mass %, based on the cathode mixture as 100 mass %.

In this Example, the energy added to the materials to be mixed by a ball mill (preferably a planetary ball mill) was larger than the energy added to the materials to be mixed by an ultrasonic dispersing apparatus and a shaking apparatus. As a result, it was possible to change the property of the sulfide solid electrolyte (E1) in the first step.

Example 2

(Manufacture of Mixture (First Step))

A mixture was obtained in the same way as in Example 1.
(Manufacture of Cathode Mixture (Cathode Mixture Paste) (Second Step))

A cathode mixture paste according to Example 2 was obtained in the same way as in Example 1, except that the mixture had a solid content of 9.2 mass % based on the entirety of the cathode mixture as 100 mass %. The mass ratio of the cathode active material, the solid electrolyte (E2), the conductive assistant (C2) and the binder was the same as in Example 1.

Example 3

(Manufacture of Mixture (First Step))

A mixture was obtained in the same way as in Example 1, except that $Li_2S$—$P_2S_5$—LiI ($Li_2S:P_2S_5$:LiI=75:25:20 (mol ratio)) was used as the sulfide solid electrolyte (E1), and the mixing ratio of the conductive assistant (C1) and E1 was changed to C1:E1=1:2 by mass.
(Manufacture of Cathode Mixture (Cathode Mixture Paste) (Second Step))

A cathode mixture paste according to Example 3 was obtained in the same way as in Example 1, except that the mixture had a solid content of 4.8 mass % based on the entirety of the cathode mixture as 100 mass %. The mass ratio of the cathode active material, the solid electrolyte (E2), the conductive assistant (C2) and the binder was the same as in Example 1.

Example 4

(Manufacture of Mixture (First Step))

A mixture was obtained in the same way as in Example 3.
(Manufacture of Cathode Mixture (Cathode Mixture Paste) (Second Step))

A cathode mixture paste according to Example 4 was obtained in the same way as in Example 1 except that the mixture has a solid content of 1.7 mass % based on the entirety of the cathode mixture as 100 mass %. The mass ratio of the cathode active material, the solid electrolyte (E2), the conductive assistant (C2) and the binder was the same as in Example 1.

Example 5

(Manufacture of Mixture (First Step))

A mixture was obtained in the same way as in Example 3, except that acetylene black (AB) was used as the conductive assistant (C1) instead of VGCF.
(Manufacture of Cathode Mixture (Cathode Mixture Paste) (Second Step))

A cathode mixture paste according to Example 5 was obtained in the same way as in Example 1, except that the mixture had a solid content of 1.7 mass % based on the entirety of the cathode mixture as 100 mass %. The mass ratio of the cathode active material, the solid electrolyte (E2), the conductive assistant (C2) and the binder was the same as in Example 1.

Example 6

(Manufacture of Mixture (First Step))

A mixture was obtained in the same way as in Example 1, except that the mixing ratio of the conductive assistant (C1) and the sulfide solid electrolyte (E1) was changed to C1:E1=1:16 by mass.
(Manufacture of Cathode Mixture (Cathode Mixture Paste) (Second Step))

A cathode mixture paste according to Example 6 was obtained in the same way as in Example 1, except that the mixture had a solid content of 6.3 mass % based on the entirety of the cathode mixture as 100 mass %. The mass ratio of the cathode active material, the solid electrolyte (E2), the conductive assistant (C2) and the binder was the same as in Example 1.

Comparative Example 1

A cathode mixture paste was manufactured without the mixture. That is, a cathode mixture paste according to Comparative Example 1 was obtained in the same way as in Example 1 except that the mixture had a solid content of 0 mass % based on the entirety of the cathode mixture paste as 100 mass %. The mass ratio of the cathode active material, the solid electrolyte (E2), the conductive assistant (C2) and the binder was the same as in the Example 1.

Comparative Example 2

A cathode mixture paste according to Comparative Example 2 was obtained in the same way as in Example 4, except that $Li_2S$ was used instead of the mixture. The mass ratio of the cathode active material, the solid electrolyte (E2), the conductive assistant (C2) and the binder was the same as in the Example 1.

2. Manufacture of Anode Mixture Paste

Heptane, a butyl butyrate solution containing 5 mass % of a PVdF-based binder, Si having an average particle diameter of 5 μm (manufactured by KOJUNDO CHEMICAL LABORATORY CO., LTD.) as an anode active material, VGCF as a conductive assistant, and LiI—$Li_2S$—$P_2S_5$ based glass ceramic having an average particle diameter of 0.8 μm as a solid electrolyte were added in a polypropylene container, and stirred for 30 seconds by an ultrasonic dispersing apparatus. Next, the container was shaken for 3 minutes by a shaking apparatus, whereby an anode mixture paste was obtained.

3. Manufacture of Paste for Solid Electrolyte Layer

Heptane, a heptane solution containing 5 mass % of a butadiene rubber based binder, and LiI—$Li_2S$—$P_2S_5$ based glass ceramic having an average particle diameter of 2.5 μm as a solid electrolyte were added in a polypropylene container, and stirred for 30 seconds by an ultrasonic dispersing apparatus. Next, the container was shaken for 3 minutes by a shaking apparatus, whereby a paste for solid electrolyte layer was obtained.

4. Manufacture of Cathode and Anode

The cathode mixture paste was applied on an aluminum foil by a blade method with an applicator. After applied, the paste was dried for 30 minutes on a hot plate at 100° C., whereby a cathode including a cathode mixture layer on a surface of the aluminum foil was obtained. In the same way, the anode mixture paste was applied on a copper foil and dried, whereby an anode including an anode mixture layer on a surface of the copper foil was obtained.

5. Manufacture of Solid Electrolyte Layer 5.1. Application of Paste for Solid Electrolyte Layer (Cathode Side)

The above cathode was pressed in advance. To the cathode to which the press was carried out in advance, the paste for solid electrolyte layer was applied on a surface of the cathode mixture layer by a die coater, and dried for 30 minutes on a hot plate at 100° C. After that, a roll press was carried out thereon at 2 ton/cm$^2$, whereby a cathode side stack provided with a solid electrolyte layer on a surface of the cathode was obtained.

5.2. Application of Paste for Solid Electrolyte Layer (Anode Side)

The above anode was pressed in advance. To the anode to which the press was carried out in advance, the paste for solid electrolyte layer was applied on a surface of the cathode mixture layer by a die coater, and dried for 30 minutes on a hot plate at 100° C. After that, a roll press was carried out thereon at 2 ton/cm$^2$, whereby an anode side stack to obtain a solid electrolyte layer on a surface of the anode.

6. Manufacture of All-Solid-State Lithium Ion Secondary Battery

The cathode side stack and the anode side stack were each punched out, and overlapped to each other in a manner to stick their solid electrolyte layers together. Here, they were overlapped to each other, with a solid electrolyte layer that was not pressed (paste for solid electrolyte layer) transferred between the solid electrolyte layer of the cathode side stack and the solid electrolyte layer of the anode side stack. After that, they were pressed at 2 ton/cm$^2$ at a temperature of 130° C., whereby a power generation element including the cathode, the solid electrolyte layer and the anode in the order mentioned was obtained. The obtained power generation element was sealed in laminate and restrained at 15 MPa, whereby an all-solid-state lithium ion secondary battery for evaluation was made.

7. Evaluation 7.1. Charge-Discharge Performance Evaluation

Regarding each manufactured all-solid-state lithium ion secondary battery, constant current-constant voltage charge and constant voltage discharge were carried out twice at 3 hour-rate until the battery voltage reached the upper-limit voltage (in Examples, 4. 55 V). The final current was set as $\frac{1}{100}$ C. The discharge capacity at the second time was set as the initial capacity. The maximum value (a) of dQ/dV of the battery at the first charge when it was in a state ranging between that of an uncharged state and that of when the battery had a voltage less than the lower-limit voltage, and the maximum value (b) of dQ/dV of the battery at the first charge when it was in a state ranging between that of when the battery had the lower-limit voltage and that of when the battery had the upper-limit voltage were obtained, and a/b was calculated. The results are shown in Table 1 below.

7.2. Resistance Evaluation (DCIR Measurement)

Regarding each manufactured all-solid-state lithium ion secondary battery, a resistance ($\Omega_1$) at a low SOC (3.26 V) and a resistance ($\Omega_2$) at a high SOC (3.58 V) were each measured by DCIR measurement, and the resistance ratio ($\Omega_1/\Omega_2$) was calculated. The evaluation was carried out with the value of the resistance ratio of the all-solid-state lithium ion secondary battery according to Comparative Example 1 set as 100%. The results are shown in Table 1 below.

7.3. Endurance Test

As an endurance test on each manufactured all-solid-state lithium ion secondary battery, charge and discharge were repeated 300 times at 0.5 hour-rate, and thereafter constant current-constant voltage charge and constant voltage discharge were carried out once at 3 hour-rate, until the battery voltage reached the upper-limit voltage (in Examples, 4.55 V). The final current was $\frac{1}{100}$ C. From the ratio of the battery capacities before and after the endurance test, the capacity maintenance ratio was obtained. The evaluation was carried out with the capacity maintenance ratio of the all-solid-state lithium ion secondary battery according to Comparative Example 1 set as 100%. The results are shown in Table 1 below.

7.4. Cathode Mixture Evaluation

The number of lithium ions released from the manufactured cathode mixture was evaluated as follows.

Regarding each manufactured all-solid-state lithium ion secondary battery, the number of lithium ions released from the entirety of the cathode mixture at a potential lower than the potential at which the cathode active material releases and occludes lithium ions, when the battery was charged until the upper-limit potential (in Examples, 4.55 V) from an uncharged state at the first charge, was determined as $Li_1$. The number of lithium ions released from the entirety of the cathode mixture from when the battery had a potential at which the cathode active material releases and occludes lithium ions until when the battery had the upper-limit potential was determined as $Li_2$. The ratio $Li_1/Li_2$ was calculated. Specifically, $Li_1/Li_2$ was calculated from the ratio of the charge capacity (Ah) from uncharged state until the battery voltage reached 3.0 V and the charge capacity (Ah) from 3.0 V until the battery reached the upper-limit voltage (in Examples, 4.55 V). The number of lithium ions depends on the capacity and coulomb constant. Therefore, the ratio of the numbers of lithium ions can be calculated from the capacity ratio. The results are shown in Table 1 below.

8. Evaluation Result

TABLE 1

| | | Mixture | | | | | | | Evaluation result | | |
| --- | --- | --- | --- | --- | --- | --- | --- | --- | --- | --- | --- |
| | Conductive assistant | Sulfide solid electrolyte (E1) | | | | | Mixture content | | Resistance ratio | Capacity maintenance ratio | $Li_1/Li_2$ |
| | (C1) | $Li_2S$ | $P_2S_5$ | LiI | LiBr | C1:E1 | (mass %) | a/b | (%) | (%) | |
| Comp. Ex. 1 | — | — | — | — | — | — | 0 | 0.01 | 100 | 100 | 0.007 |
| Comp. Ex. 2 | — | 100 | — | — | — | — | 4.8 | 0.01 | 101 | — | 0.007 |
| Ex. 1 | VGCF | 75 | 25 | 10 | 15 | 1:8 | 6.2 | 0.21 | 74 | 111 | 0.084 |

TABLE 1-continued

| | | | | | | | | Evaluation result | | |
|---|---|---|---|---|---|---|---|---|---|---|
| | Mixture | | | | | | | Resistance | Capacity maintenance | |
| | Conductive assistant | Sulfide solid electrolyte (E1) | | | | Mixture content | | ratio | ratio | Li$_1$/ |
| | (C1) | Li$_2$S | P$_2$S$_5$ | LiI | LiBr | C1:E1 | (mass %) | a/b | (%) | (%) | Li$_2$ |
| Ex. 2 | VGCF | 75 | 25 | 10 | 15 | 1:8 | 9.2 | 0.50 | 76 | 111 | 0.122 |
| Ex. 3 | VGCF | 75 | 25 | 20 | 0 | 1:2 | 4.8 | 0.06 | 96 | — | 0.040 |
| Ex. 4 | VGCF | 75 | 25 | 20 | 0 | 1:2 | 1.7 | 0.04 | 99 | — | 0.013 |
| Ex. 5 | AB | 75 | 25 | 20 | 0 | 1:2 | 1.7 | 0.09 | 98 | — | 0.032 |
| Ex. 6 | VGCF | 75 | 25 | 10 | 15 | 1:16 | 6.3 | 0.07 | 85 | — | 0.056 |

As is apparent from the results shown in Table 1, when the predetermined mixture was added in the cathode mixture as in Examples 1 to 6, the electrochemical reaction progressed (that is, lithium ions transferred from the cathode to the anode) at a low potential at the first charge of the battery, and the values of a/b and Li$_1$/Li$_2$ became large, compared to Comparative Example 1 in which no mixture was contained in the cathode mixture. In addition, in the charge and discharge after the first charge, the battery resistance at a low SOC became small. It is considered that this is because lithium ions were efficiently released from the mixture at the first charge, and after the first charge was completed, the anode was properly doped with lithium. It was also confirmed that the durability of the battery improved in Examples 1 and 2, compared to Comparative Example 1. In contrast, regarding Comparative Example 2 in which Li$_2$S (sulfide solid electrolyte to which mixing was not carried out in advance) was added to the cathode mixture had almost the same values of a/b and Li$_1$/Li$_2$ as that of Comparative Example 1. In addition, the battery resistance at a low SOC at charges and discharges after the first charge was almost the same as that of Comparative Example 1. From the results of Comparative Examples 1 and 2, it was found that a desired doping effect was not obtained only by adding a conventional solid electrolyte to the cathode mixture. That is, it was found that it is important, in manufacturing the cathode mixture, to mix the conductive assistant (C1) and the sulfide solid electrolyte (E1) in advance, to change the property of the mixture of the sulfide solid electrolyte (E1), and to mix the mixture in the cathode mixture.

Considering the mechanism shown in FIGS. 5A to 5F, the kinds of the cathode active material, the solid electrolyte, the conductive material and the binder contained in the cathode mixture, the kind of the cathode current collector that forms the cathode, and the kinds of the solid electrolyte layer and the anode that form the all-solid-state lithium ion secondary battery are not limited to the above Examples. It is obvious that a desired effect is provided by any kind of materials, as long as the cathode mixture satisfies the predetermined value of Li$_1$/Li$_2$. It is also obvious that a desired effect is provided by any kind of materials as long as the all-solid-state lithium ion secondary battery satisfies the predetermined value of a/b. Needless to say, "lower-limit voltage", "upper-limit voltage" and "upper-limit potential" also depend on the kind of the material that forms the cathode mixture and the kind of the material that forms the battery, and not limited to the values shown in the above Examples.

INDUSTRIAL APPLICABILITY

The all-solid-state lithium ion secondary battery of the present disclosure may be used, for example, as a large size on-vehicle power source.

DESCRIPTION OF REFERENCE NUMERALS 10 cathode mixture layer
11 cathode current collector
12 anode mixture layer
13 anode current collector
20 cathode
21 solid electrolyte layer
22 anode
30 all-solid-state lithium ion secondary battery The forgoing embodiments and advantages are exemplary and are not to construed as limiting the scope of the disclosure. Various modifications and alternatives will be apparent and are not intended limit the scope of the disclosure.

The invention claimed is:

1. A method for manufacturing a cathode mixture comprising:
    a first step of mixing at least a conductive assistant (C1) and a sulfide solid electrolyte (E1) to obtain a mixture; and
    a second step of mixing at least a cathode active material, a solid electrolyte (E2) and the mixture of the first step to obtain a cathode mixture,
    wherein energy added to the sulfide solid electrolyte (E1) in the first step is larger than energy added to the solid electrolyte (E2) in the second step, and the mixture obtained in the first step is a material that releases lithium ions at a potential lower than a potential at which the cathode active material releases and occludes lithium ions.

2. The method for manufacturing a cathode mixture according to claim 1, wherein in the first step, the conductive assistant (C1) and the sulfide solid electrolyte (E1) are mixed by a ball mill.

3. The method of claim 2, where the ball mill adds said energy to the sulfide solid electrolyte (E1).

4. The method for manufacturing a cathode mixture according to claim 1, wherein in the second step where the cathode mixture has a solid content of from 1.7 mass % to 9.2 mass % based on entirety of the cathode mixture as 100 mass %.

5. The method for manufacturing a cathode mixture according to claim 1, wherein in the first step, the sulfide solid electrolyte (E1) in an amount of from 200 pts. by mass to 1600 pts. mass is mixed per 100 pts. by mass of the conductive assistant (C1).

6. The method for manufacturing a cathode mixture according to claim 1, wherein in the second step, a sulfide solid electrolyte (E3) is used as the solid electrolyte (E2).

7. The method for manufacturing a cathode mixture according to claim 1, wherein in the second step, a conductive assistant (C2) and a binder are further mixed, with the cathode active material, the solid electrolyte (E2) and the mixture obtained from the first step.

8. The method of claim 1, wherein the energy added to the sulfide solid electrolyte (E1) in the first step is by a mechanical mixing, and the energy added to the cathode active material, solid electrolyte (E20 and the mixture obtained from the first step is by mechanical mixing.

9. The method of claim 1, wherein said sulfide solid electrolyte (E1) comprises Li.

10. The method of claim 1, wherein said cathode active materials comprises Li.

11. The method of claim 1, wherein said solid electrolyte (E2) comprises Li.

12. A method for manufacturing a cathode comprising arranging the cathode mixture manufactured by the method according to claim 1, onto a surface of a cathode current collector.

13. The method for manufacturing a cathode according to claim 12, comprising:
    obtaining a cathode mixture paste that includes the cathode mixture and a solvent; and
    applying the cathode mixture paste on the surface of the cathode current collector and drying the cathode mixture paste, to form a cathode mixture layer on the surface of the cathode current collector.

14. A method for manufacturing an all-solid-state lithium ion secondary battery comprising:
    stacking the cathode manufactured by the method according to claim 12, a solid electrolyte layer including at least a solid electrolyte, and an anode including at least an anode active material.

15. The method for manufacturing an all-solid-state lithium ion secondary battery according to claim 14, wherein the anode active material is constituted from one or more materials selected from the group consisting of silicon, silicon alloy, carbon, aluminum, aluminum alloy, tin and tin alloy.

* * * * *